US012680006B2

(12) United States Patent
Wang et al.

(10) Patent No.: US 12,680,006 B2
(45) Date of Patent: Jul. 14, 2026

(54) AZEOTROPE OR AZEOTROPE-LIKE COMPOSITIONS OF 3,3,3-TRIFLUOROPROPYNE (TFPY) AND HYDROGEN FLUORIDE (HF)

(71) Applicant: Honeywell International Inc., Charlotte, NC (US)

(72) Inventors: Haiyou Wang, Amherst, NY (US); Hang T. Pham, Amherst, NY (US); Hsueh Sung Tung, Getzville, NY (US); Rajiv Ratna Singh, Getzville, NY (US)

(73) Assignee: Solstice Advanced Materials US, Inc., Morris Plains, NJ (US)

( * ) Notice: Subject to any disclaimer, the term of this patent is extended or adjusted under 35 U.S.C. 154(b) by 882 days.

(21) Appl. No.: 17/774,055

(22) PCT Filed: Nov. 5, 2020

(86) PCT No.: PCT/IB2020/020073
§ 371 (c)(1),
(2) Date: May 3, 2022

(87) PCT Pub. No.: WO2021/090073
PCT Pub. Date: May 14, 2021

(65) Prior Publication Data
US 2022/0363968 A1     Nov. 17, 2022

Related U.S. Application Data

(60) Provisional application No. 62/931,622, filed on Nov. 6, 2019.

(51) Int. Cl.
*C09K 5/04*     (2006.01)

(52) U.S. Cl.
CPC .......... *C09K 5/045* (2013.01); *C09K 2205/32* (2013.01)

(58) Field of Classification Search
None
See application file for complete search history.

(56) References Cited

U.S. PATENT DOCUMENTS

2009/0224207 A1     9/2009  Pham et al.
2016/0009555 A1*    1/2016  Bonnet ................... C07C 19/08
                                                         252/182.12

(Continued)

OTHER PUBLICATIONS

International Search Report and Written Opinion issued in International Application PCT/IB2020/020073, mailed Mar. 15, 2021, 12 pages.

(Continued)

*Primary Examiner* — Arrie L Reuther
*Assistant Examiner* — Devin Mitchell Darling
(74) *Attorney, Agent, or Firm* — Faegre Drinker Biddle & Reath LLP

(57)     ABSTRACT

Heterogenous azeotrope or azeotrope-like compositions comprising 3,3,3-trifluoropropyne (TFPY) and hydrogen fluoride (HF) which may include from about 71.5 wt. % to about 98.8 wt. % 3,3,3-trifluoropropyne (TFPY) and from about 1.2 wt. % to about 28.5 wt. % hydrogen fluoride and have a boiling point between about $-10.0°$ C. and about $25.0°$ C. at a pressure of between about 61 psia and about 171 psia. The azeotrope or azeotrope-like compositions may be used to separate 3,3,3-trifluoropropyne (TFPY) as an impurity from compositions of 2-chloro-3,3,3-trifluoropropene (1233xf), 2-chloro-1,1,1,2-tetrafluoropropane (HCFC-244bb), or 2,3,3,3-tetrafluoropropene (HFO-1234yf).

10 Claims, 1 Drawing Sheet

(56) References Cited

U.S. PATENT DOCUMENTS

| | | |
|---|---|---|
| 2016/0023974 A1 | 1/2016 | Bonnet et al. |
| 2016/0046548 A1 | 2/2016 | Bonnet et al. |
| 2018/0057434 A1 | 3/2018 | Kopkalli et al. |
| 2019/0016653 A1 | 1/2019 | Baba-Ahmed et al. |

OTHER PUBLICATIONS

Extended European Search Report issued in EP Application 20885633. 6, mailed Oct. 26, 2023, 5 pages.

* cited by examiner

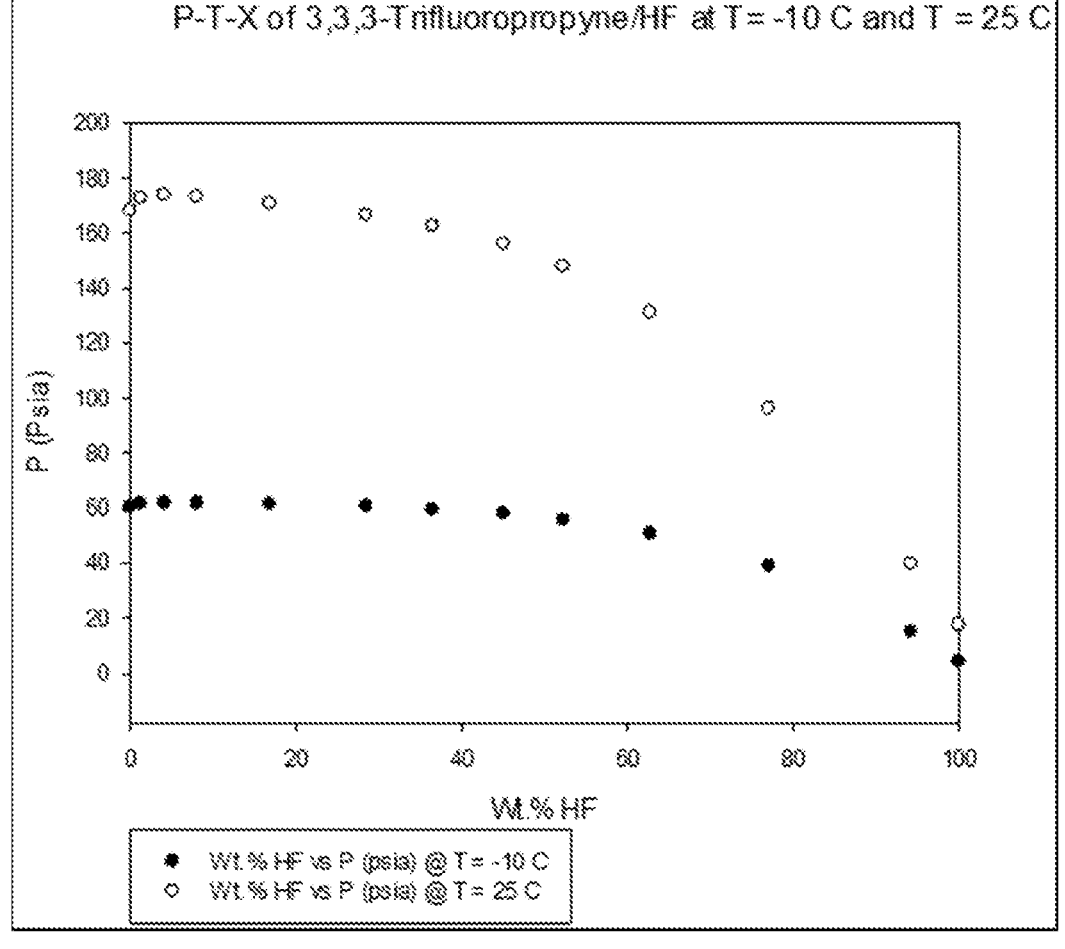

AZEOTROPE OR AZEOTROPE-LIKE COMPOSITIONS OF 3,3,3-TRIFLUOROPROPYNE (TFPY) AND HYDROGEN FLUORIDE (HF)

CROSS-REFERENCE TO RELATED APPLICATION

This application is a U.S. National Stage application of International Application No. PCT/IB2020/020073 with an International filing date of 5 Nov. 2020, which claims priority to U.S. Provisional Application No. 62/931,622, filed Nov. 6, 2019, both of which are herein incorporated by reference in their entireties.

FIELD

The present disclosure pertains to azeotrope or azeotrope-like compositions and, in particular, azeotrope or azeotrope-like compositions comprising effective amounts of 3,3,3-trifluoropropyne (TFPY) and hydrogen fluoride (HF).

BACKGROUND OF THE DISCLOSURE

Hydrofluoroolefins (HFOs), such as tetrafluoropropenes, including 2,3,3,3-tetrafluoropropene (HFO-1234yf), are known to be effective refrigerants, heat transfer media, propellants, foaming agents, blowing agents, gaseous dielectrics, sterilant carriers, polymerization media, particulate removal fluids, carrier fluids, buffing abrasive agents, displacement drying agents and power cycle working fluids. Unlike chlorofluorocarbons (CFCs) and hydrochlorofluorocarbons (HCFCs), both of which potentially damage the Earth's ozone layer, HFOs pose no threat to the ozone layer. HFO-1234yf has also been shown to be a low global warming compound with low toxicity and, hence, can meet increasingly stringent requirements for refrigerants in mobile air conditioning. Accordingly, compositions containing HFO-1234yf are among the materials being developed for use in many of the aforementioned applications.

One manufacturing process for HFO-1234yf uses 1,1,2,3-tetrachloropropene (HCFC-1230xa) as starting raw material. The process comprises the following three steps:

Step (1) 1230xa+3HF→2-chloro-3,3,3-trifluoropropene (1233xf)+3HCl in a vapor phase reactor charged with a solid catalyst;

Step (2) 1233xf+HF→2-chloro-1,1,1,2-tetrafluoropropane (244bb) in a liquid phase reactor charged with a liquid catalyst; and Step (3) 244bb→1234yf+HCl in a vapor phase reactor or in the liquid phase.

During the foregoing process, 3,3,3-trifluoropropyne (TFPY) is sometimes produced and/or may otherwise present as an impurity, which is undesirable, and therefore methods of reducing the presence of TFPY, as well as other impurities, are desired.

SUMMARY

The present disclosure provides azeotrope or azeotrope-like compositions of 3,3,3-trifluoropropyne (TFPY) and hydrogen fluoride (HF).

It is well-recognized in the art that it is not possible to predict the formation of azeotropes, and the present inventors have discovered unexpectedly that 3,3,3-trifluoropropyne (TFPY) and hydrogen fluoride (HF) form azeotrope or azeotrope-like compositions and, in particular, form heterogeneous azeotrope or azeotrope-like compositions.

The present disclosure provides a composition comprising an azeotrope or azeotrope-like composition consisting essentially of effective amounts of 3,3,3-trifluoropropyne (TFPY) and hydrogen fluoride (HF), wherein the azeotrope or azeotrope-like composition has a boiling point between about −10.0° C. and about 25.0° C. at a pressure of between about 61 psia and about 171 psia.

The azeotrope or azeotrope-like composition may consist essentially of from about 71.5 wt. % to about 98.8 wt. % 3,3,3-trifluoropropyne (TFPY) and from about 1.2 wt. % to about 28.5 wt. % hydrogen fluoride or may consist essentially of from about 83.1 wt. % to about 98.8 wt. % 3,3,3-trifluoropropyne (TFPY) and from about 1.2 wt. % to about 16.9 wt. % hydrogen fluoride, wherein the azeotrope or azeotrope-like composition has a boiling point between about −10.0° C. and about 25.0° C. at a pressure of between about 61 psia and about 171 psia.

The present disclosure also provides a method of forming an azeotrope or azeotrope-like composition comprising the step of combining 3,3,3-trifluoropropyne (TFPY) and hydrogen fluoride (HF) to form an azeotrope or azeotrope-like composition consisting essentially of effective amounts of 3,3,3-trifluoropropyne (TFPY) and hydrogen fluoride (HF) and having a boiling point between about −10.0° C. and about 25.0° C. at a pressure of between about 61 psia and about 171 psia.

The present disclosure further provides a method of separating 3,3,3-trifluoropropyne (TFPY) as an impurity from a composition which includes a primary compound and 3,3,3-trifluoropropyne (TFPY) as an impurity, comprising the steps of: providing a composition including the primary compound and 3,3,3-trifluoropropyne (TFPY) as an impurity; modifying the relative amounts of 3,3,3-trifluoropropyne (TFPY) and hydrogen fluoride (HF) and subjecting the composition to conditions effective to form an azeotrope or azeotrope-like composition consisting essentially of, or consisting of, effective amounts of 3,3,3-trifluoropropyne (TFPY) and hydrogen fluoride (HF); and separating the azeotrope or azeotrope-like composition from the composition including the primary compound. The primary compound can be selected form the group consisting of 2-chloro-3,3,3-trifluoropropene (1233xf), 2-chloro-1,1,1,2-tetrafluoropropane (HCFC-244bb), and 2,3,3,3-tetrafluoropropene (HFO-1234yf); or selected from the group consisting of 1,1,1,2,3-pentafluoropropane (HFC-245eb) and 2,3,3,3-tetrafluoropropene (HFO-1234yf); or selected from the group consisting of 1,3,3,3-tetrafluoropropene (HFO-1234ze) and 1,1,1,3,3-pentafluoropropane (HFC-245fa); The separation step may comprise at least one of phase separation, distillation, and fractionation.

In the foregoing method, the step of modifying the relative amounts of 3,3,3-trifluoropropyne (TFPY) and hydrogen fluoride (HF) may involve adding 3,3,3-trifluoropropyne (TFPY) to the composition, adding hydrogen fluoride (HF) to the composition, or adding both 3,3,3-trifluoropropyne (TFPY) and hydrogen fluoride (HF) to the composition.

DESCRIPTION OF THE DRAWING

FIG. 1 is a plot of the vapor pressures of the mixtures formed in accordance with Example 1 as measured at −10° C. and 25° C.

DETAILED DESCRIPTION

It has been found that 3,3,3-trifluoropropyne (TFPY) and hydrogen fluoride (HF) form heterogeneous azeotrope and azeotrope-like compositions or mixtures, and the present disclosure provides heterogenous azeotrope or azeotrope-like compositions comprising 3,3,3-trifluoropropyne (TFPY) and hydrogen fluoride (HF). The azeotrope or azeotrope-like compositions may consist essentially of 3,3, 3-trifluoropropyne (TFPY) and hydrogen fluoride (HF), or the azeotrope or azeotrope-like compositions may consist of 3,3,3-trifluoropropyne (TFPY) and hydrogen fluoride (HF).

The present inventors have found experimentally that 3,3,3-trifluoropropyne (TFPY) and hydrogen fluoride (HF) form an azeotrope or azeotrope-like composition.

A heterogenous azeotrope consists of two liquid phases and one vapor phase all in equilibrium. For a heterogenous azeotrope at a given temperature and pressure, the composition of each of the two liquid phases and the composition of the vapor phase remain constant. If a heterogenous azeotrope is formed, at a constant pressure the boiling point of the heterogenous azeotrope will be less than the lower boiling point component (a "minimum boiling azeotrope").

An "azeotrope" (or "azeotropic") composition is a unique combination of two or more components. An azeotrope can be either homogenous (which has one liquid phase) or heterogenous (which has two liquid phases). An azeotrope composition can be characterized in various ways. For example, at a given pressure, an azeotrope composition boils at a constant characteristic temperature which is either greater than the higher boiling point component (maximum boiling azeotrope) or less than the lower boiling point component (minimum boiling azeotrope). However, in the case of a heterogenous azeotrope the boiling point of the azeotrope will always be below the boiling point of the lower boiling point component. At this characteristic temperature a homogenous azeotrope has the same composition in both the vapor and liquid phases. In the case of a heterogenous azeotrope then at this characteristic temperature the composition of each of the two liquid phases and the vapor phase will remain constant upon boiling. The azeotrope composition does not fractionate upon boiling or evaporation. Therefore, the components of the azeotrope composition cannot be separated during a phase change.

A homogenous azeotrope composition is also characterized in that at the characteristic azeotrope temperature, the bubble point pressure of the liquid phase is identical to the dew point pressure of the vapor phase. The behavior of an azeotrope composition is in contrast with that of a non-azeotrope composition in which during boiling or evaporation, the liquid composition changes to a substantial degree.

One of ordinary skill in the art would understand however that at different pressures, both the composition and the boiling point of the azeotrope composition will vary to some extent. Therefore, depending on the temperature and/or pressure, an azeotrope composition can have a variable composition. The skilled person would therefore understand that composition ranges, rather than fixed compositions, can be used to define azeotrope compositions. In addition, an azeotrope may be defined in terms of exact weight percentages of each component of the compositions characterized by a fixed boiling point at a specified pressure.

An "azeotrope-like" composition is a composition of two or more components which behaves substantially as an azeotrope composition. Thus, for the purposes of this disclosure, an azeotrope-like composition is a combination of two or more different components which, in the case of a homogenous azeotrope when in liquid form under given pressure, will boil at a substantially constant temperature, and which will provide a vapor composition substantially identical to the liquid composition undergoing boiling. In the case of a heterogenous azeotrope two liquid phases form under a given pressure which will be covered by a vapor composition. Each of the two liquid phases and the vapor phase will remain substantially constant on boiling.

For the purposes of this disclosure, an azeotrope-like composition is a composition or range of compositions which boil(s) at a temperature range of between about −10° C. and 25° C. at a pressure from about 61 psia to about 171 psia.

Azeotrope or azeotrope-like compositions can be identified using a number of different methods.

For the purposes of this disclosure the azeotrope or azeotrope-like composition is identified experimentally using an ebulliometer (Walas, Phase Equilibria in Chemical Engineering, Butterworth-Heinemann, 1985, 533-544). An ebulliometer is designed to provide extremely accurate measurements of the boiling points of liquids by measuring the temperature of the vapor-liquid equilibrium.

The boiling points of each of the components alone are measured at a constant pressure. As the skilled person will appreciate, for a binary azeotrope or azeotrope-like composition, the boiling point of one of the components of the composition is initially measured. The second component of the composition is then added in varying amounts and the boiling point of each of the obtained compositions is measured using the ebulliometer at said constant pressure. In the case of a ternary azeotrope the initial composition would comprise of a binary blend and a third component is added in varying amounts. The boiling point of each of the obtained ternary compositions is measured using the ebulliometer at said constant pressure.

The measured boiling points are plotted against the composition of the tested composition, for example, for a binary azeotrope, the amount of the second component added to the composition, (expressed as either weight % or mole %). The presence of an azeotrope composition can be identified by the observation of a maximum or minimum boiling temperature which is greater or less than the boiling points of any of the components alone.

As the skilled person will appreciate, the identification of the azeotrope or azeotrope-like composition is made by the comparison of the change in the boiling point of the composition on addition of the second component to the first component, relative to the boiling point of the first component. Thus, it is not necessary that the system be calibrated to the reported boiling point of the particular components in order to measure the change in boiling point.

As previously discussed, at the maximum or minimum boiling point, the composition of the vapor phase will be identical to the composition of the liquid phases. The azeotrope-like composition is therefore that composition of components which provides a substantially constant minimum or maximum boiling point, that is a boiling point between about −10° C. and about 25° C. at a pressure of between about 61 psia and about 171 psia at which substantially constant boiling point the composition of the vapor phase will be substantially identical to the composition of the liquid phases.

The present disclosure provides an azeotrope or azeotrope-like composition which comprises effective amounts of 3,3,3-trifluoropropyne (TFPY) and hydrogen fluoride (HF) to form an azeotrope or azeotrope-like composition. As used herein, the term "effective amount" is an amount of each component which, when combined with the other component, results in the formation of an azeotrope or azeotrope-like composition.

The present azeotrope or azeotrope-like compositions may consist essentially of combinations of 3,3,3-trifluoropropyne (TFPY) and hydrogen fluoride (HF) or consist of combinations of 3,3,3-trifluoropropyne (TFPY) and hydrogen fluoride (HF).

As used herein, the term "consisting essentially of", with respect to the components of an azeotrope or azeotrope-like composition or mixture, means the composition contains the indicated components in an azeotrope or azeotrope-like ratio, and may contain additional components provided that the additional components do not form new azeotrope or azeotrope-like systems. For example, azeotrope mixtures consisting essentially of two compounds are those that form binary azeotropes, which optionally may include one or more additional components, provided that the additional components do not render the mixture non-azeotropic and do not form an azeotrope with either or both of the compounds (e.g., do not form a ternary or higher azeotrope).

The present disclosure also provides a method of forming an azeotrope or azeotrope-like composition by mixing, combining, or blending, effective amounts of, 3,3,3-trifluoropropyne (TFPY) and hydrogen fluoride (HF). Any of a wide variety of methods known in the art for combining two or more components to form a composition can be used in the present methods. For example, 3,3,3-trifluoropropyne (TFPY) and hydrogen fluoride (HF) can be mixed, blended, or otherwise combined by hand and/or by machine, as part of a batch or continuous reaction and/or process, or via combinations of two or more such steps. The components can be provided in the required amounts, for example by weighing and then combining the amounts.

The azeotrope or azeotrope-like composition has a boiling point between about –10° C. and about 25° C. at a pressure of between about 61 psia and about 171 psia, and consists essentially of, or consists of, from about 71.5 wt. % to about 98.8 wt. % 3,3,3-trifluoropropyne (TFPY) and from about 1.2 wt. % to about 28.5 wt. % hydrogen fluoride (HF).

The azeotrope or azeotrope-like composition having a boiling point between about –10.0° C. and about 25.0° C. at a pressure of between about 61 psia and about 171 psia may also consist essentially of, or consist of, from about 71.5 wt. % to about 98.8 wt. % 3,3,3-trifluoropropyne (TFPY) and from about 1.2 wt. % to about 28.5 wt. % hydrogen fluoride, or may consist essentially of, or consist of, from about 83.1 wt. % to about 98.8 wt. % 3,3,3-trifluoropropyne (TFPY) and from about 1.2 wt. % to about 16.9 wt. % hydrogen fluoride (HF), or within any range defined between any two of the foregoing values.

The present disclosure also provides a composition comprising the azeotrope or azeotrope-like composition. For example, there is provided a composition comprising at least about 14 wt. % of the azeotrope or azeotrope-like compositions, or at least about 21 wt. % of the azeotrope or azeotrope-like compositions, or at least about 25 wt. % of the azeotrope or azeotrope-like compositions, or at least about 70 wt. % of the azeotrope or azeotrope-like compositions, or at least about 90 wt. % of the azeotrope or azeotrope-like compositions, or at least 95 wt. % of the azeotrope or azeotrope-like compositions, 99 wt. % of the azeotrope or azeotrope-like compositions.

The azeotrope or azeotrope-like composition comprising, consisting essentially of, or consisting of effective amounts of 3,3,3-trifluoropropyne (TFPY) and hydrogen fluoride (HF) disclosed herein may be used for separating 3,3,3-trifluoropropyne (TFPY) as an impurity from other compositions, such as compositions of: 2-chloro-3,3,3-trifluoropropene (1233xf), 2-chloro-1,1,1,2-tetrafluoropropane (HCFC-244bb), and 2,3,3,3-tetrafluoropropene (HFO-1234yf); or 1,1,1,2,3-pentafluoropropane (HFC-245eb) and 2,3,3,3-tetrafluoropropene (HFO-1234yf); or 1,3,3,3-tetrafluoropropene (HFO-1234ze) and 1,1,1,3,3-pentafluoropropane (HFC-245fa).

The preparation of azeotropic or azeotrope-like compositions comprising, consisting essentially of, or consisting of effective amounts of 3,3,3-trifluoropropyne (TFPY) and hydrogen fluoride (HF) allows separation techniques such as azeotropic distillation, for example, to be used to remove 3,3,3-trifluoropropyne (TFPY) as an impurity from other compositions.

In particular, an azeotrope or azeotrope-like composition comprising, consisting essentially of, or consisting of effective amounts of 3,3,3-trifluoropropyne (TFPY) and hydrogen fluoride (HF) may be formed from a composition including one or both of 3,3,3-trifluoropropyne (TFPY) and hydrogen fluoride (HF) together with one or more other chemical compounds other than 3,3,3-trifluoropropyne (TFPY) and hydrogen fluoride (HF), such as 2-chloro-1,1,1,2-tetrafluoropropane (HCFC-244bb), for example. Following the formation of the azeotrope or azeotrope-like composition, the azeotrope or azeotrope-like composition may be separated from the other chemical compounds by a suitable method, such as by distillation, phase separation, or fractionation. This procedure can be used to separate 3,3,3-trifluoropropyne (TFPY) and hydrogen fluoride (HF) from other compounds, such as those mentioned above (compounds selected form the group consisting of 2-chloro-3,3,3-trifluoropropene (1233xf), 2-chloro-1,1,1,2-tetrafluoropropane (HCFC-244bb), and 2,3,3,3-tetrafluoropropene (HFO-1234yf); or selected from the group consisting of 1,1,1,2,3-pentafluoropropane (HFC-245eb) and 2,3,3,3-tetrafluoropropene (HFO-1234yf); or selected from the group consisting of 1,3,3,3-tetrafluoropropene (HFO-1234ze) and 1,1,1,3,3-pentafluoropropane (HFC-245fa).

In one example, the present disclosure provides a method of separating 3,3,3-trifluoropropyne (TFPY) as an impurity from a primary, crude composition of 2-chloro-1,1,1,2-tetrafluoropropane (HCFC-244bb) which includes 3,3,3-trifluoropropyne (TFPY), comprising the steps of providing a primary composition of crude 2-chloro-1,1,1,2-tetrafluoropropane (HCFC-244bb), 3,3,3-trifluoropropyne (TFPY) as an impurity, modifying the relative amounts of 3,3,3-trifluoropropyne (TFPY) and hydrogen fluoride (HF) and subjecting the primary composition to conditions effective to form a secondary composition which is an azeotrope or azeotrope-like composition consisting essentially of, or consisting of, effective amounts of 3,3,3-trifluoropropyne (TFPY) and hydrogen fluoride (HF), and separating the secondary composition from the primary composition by a separation technique such as phase separation, distillation, or fractionation, for example. Thereafter, the secondary composition may be subjected to further separation or purification steps to obtain purified 2-chloro-1,1,1,2-tetrafluoropropane (HCFC-244bb). The step of modifying the relative amounts of 3,3,3-trifluoropropyne (TFPY) and hydrogen fluoride (HF) may involve adding 3,3,3-trifluoropropyne (TFPY) to the composition, adding hydrogen fluoride (HF) to the composition, or adding both 3,3,3-trifluoropropyne (TFPY) and hydrogen fluoride (HF) to the composition.

In another example, a composition may be provided which includes one of 3,3,3-trifluoropropyne (TFPY) and hydrogen fluoride (HF), together with at least one additional compound. To this composition, the other of 3,3,3-trifluoropropyne (TFPY) and hydrogen fluoride (HF) is added in a sufficient amount and the composition is subjected to conditions effective to form a composition which is an azeotrope or azeotrope-like composition consisting essentially of, or consisting of, effective amounts of 3,3,3-trifluoropropyne (TFPY) and hydrogen fluoride (HF), followed by separating the azeotrope or azeotrope-like composition from the additional compound by a separation technique such as phase separation, distillation, or fractionation, for example.

The following non-limiting examples serve to illustrate the invention.

EXAMPLES

Example 1—Vapor Liquid Equilibrium (VLE) Study

Binary compositions containing solely 3,3,3-trifluoropropyne (TFPY) and hydrogen fluoride (HF) were blended to form azeotropic mixtures at different weight percents. The vapor pressures of these mixtures were measured at −10° C. and 25° C. The results were as follows.

The P-T-X measurement of 3,3,3-trifluoropropyne (TFPY) at −10° C. and 25° C. indicated that 3,3,3-trifluoropropyne (TFPY) formed a minimum boiling azeotrope with hydrogen fluoride (HF). The azeotropic composition was about 4 to about 5 wt. % hydrogen fluoride (HF). A vapor liquid equilibrium (VLE) measurement of this system was conducted. The vapor composition of the system was verified, and it was consistent with the result of P-T-X measurement. This system is believed to be a heterogeneous system. The azeotrope composition was only 4 to 5 wt. % hydrogen fluoride (HF), based on the weight of the azeotrope composition. Table 1 below shows P-T-X phase equilibrium and vapor pressure measurements of 3,3,3-trifluoropropyne (TFPY) and hydrogen fluoride (HF) as a function of composition with varying weight percentages of hydrogen fluoride (HF) at constant temperatures of −10° C. and 25° C. The data show that the mixture is azeotropic or azeotrope-like when the vapor pressure of the mixtures of 3,3,3-trifluoropropyne (TFPY) and hydrogen fluoride (HF) is higher than the vapor pressures of 3,3,3-trifluoropropyne (TFPY) and hydrogen fluoride (HF) alone. The data from Table 1 is shown in graphic form in FIG. 1.

TABLE 1

P-T-X of 3,3,3-trifluoropropyne (TFPY)/HF at −10° C. and 25° C.

| Wt. % HF | T = −10° C. P (Psia) | T = 25° C. P(Psia) |
|---|---|---|
| 0 | 60.53 | 168.29 |
| 1.22 | 61.69 | 172.82 |
| 4.11 | 61.92 | 173.85 |
| 8.06 | 61.9 | 173.27 |
| 16.87 | 61.57 | 170.96 |
| 28.49 | 60.68 | 166.53 |
| 36.51 | 59.76 | 162.4 |
| 45.07 | 58.09 | 155.99 |
| 52.28 | 55.66 | 148.04 |
| 62.74 | 50.77 | 131.06 |
| 77.11 | 39.07 | 96.29 |
| 94.2 | 15.26 | 39.71 |
| 100 | 4.53 | 17.82 |

The azeotrope composition is about 4 wt. % at T=−10° C. and T=25° C.

Example 2—Vapor Sample Study

A mixture of 3,3,3-trifluoropropyne (TFPY) and hydrogen fluoride (HF) was prepared having 64.5 wt. % 3,3,3- trifluoropropyne (TFPY) and 35.5 wt. % hydrogen fluoride (HF). Vapor samples were taken at −10° C. and 25° C. The composition of the vapor was about 4 to about 5 wt % HF. The results are shown below in Table 2.

TABLE 2

| Sample | Grams of Sample | Temperature (° C.) | Pressure (Psia) | Wt. % HF |
|---|---|---|---|---|
| VAP 1 | 0.565 | −10.09 | 58.28 | 4.2 |
| VAP 2 | 0.57 | −10.09 | 58.24 | 4.05 |
| VAP 3 | 0.563 | 24.873 | 160.57 | 4.86 |
| VAP 4 | 0.564 | 24.873 | 160.53 | 5.01 |

The result is consistent with the P-T-X measurement in Example 1.

Example 3—Separation of 3,3,3-Trifluoropropyne (TFPY) as an Impurity

In this Example, a composition is provided which includes a primary compound, such as 2-chloro-3,3,3-trifluoropropene (1233xf), 2-chloro-1,1,1,2-tetrafluoropropane (HCFC-244bb), or 2,3,3,3-tetrafluoropropene (HFO-1234yf), together with 3,3,3-trifluoropropyne (TFPY) as an impurity. An effective amount of hydrogen fluoride (HF) is added to the composition, and the composition is subjected to conditions effective to form an azeotrope or azeotrope-like composition consisting essentially of, or consisting of, effective amounts of 3,3,3-trifluoropropyne (TFPY) and hydrogen fluoride (HF). Then, the azeotrope or azeotrope-like composition is separated from the composition including the primary compound by a separation technique such as phase separation, distillation, and/or fractionation.

Example 4—Separation of 3,3,3-Trifluoropropyne (TFPY) as an Impurity

In this Example, a composition is provided which includes a primary compound, such as 2-chloro-3,3,3-trifluoropropene (1233xf), 2-chloro-1,1,1,2-tetrafluoropropane (HCFC-244bb), or 2,3,3,3-tetrafluoropropene (HFO-1234yf), together with hydrogen fluoride (HF) and 3,3,3-trifluoropropyne (TFPY) as an impurity. An effective amount of 3,3,3-trifluoropropyne (TFPY) is added to the composition, and the composition is subjected to conditions effective to form an azeotrope or azeotrope-like composition consisting essentially of, or consisting of, effective amounts of 3,3,3-trifluoropropyne (TFPY) and hydrogen fluoride (HF). Then, the azeotrope or azeotrope-like composition is separated from the composition including the primary compound by a separation technique such as phase separation, distillation, and/or fractionation.

ASPECTS

Aspect 1 is composition comprising an azeotrope or azeotrope-like composition consisting essentially of effective amounts of 3,3,3-trifluoropropyne (TFPY) and hydrogen fluoride (HF).

Aspect 2 is the composition of Aspect 1, wherein the azeotrope or azeotrope-like composition consists essentially of from about 71.5 wt. % to about 98.8 wt. % 3,3,3-trifluoropropyne (TFPY) and from about 1.2 wt. % to about 28.5 wt. % hydrogen fluoride.

Aspect 3 is the composition of Aspect 1, wherein the azeotrope or azeotrope-like composition consists essentially of from about 83.1 wt. % to about 98.8 wt. % 3,3,3-trifluoropropyne (TFPY) and from about 1.2 wt. % to about 16.9 wt. % hydrogen fluoride (HF).

Aspect 4 is the composition of any of Aspects 1-3, wherein the azeotrope or azeotrope-like composition has a boiling point between about −10.0° C. and about 25.0° C. at a pressure of between about 61 psia and about 171 psia.

Aspect 5 is the composition of any of Aspects 1-4, wherein the azeotrope or azeotrope-like composition consists essentially of, or consists of, at least about 15 wt. % of the azeotrope or azeotrope-like composition.

Aspect 6 is the composition of any of Aspects 1-4, wherein the azeotrope or azeotrope-like composition consists essentially of, or consists of, at least about 50 wt. % of the azeotrope or azeotrope-like composition.

Aspect 7 is the composition of any of Aspects 1-4, wherein the azeotrope or azeotrope-like composition consists essentially of, or consists of, at least about 70 wt. % of the azeotrope or azeotrope-like composition.

Aspect 8 is the composition of any of Aspects 1-4, wherein the azeotrope or azeotrope-like composition consists essentially of, or consists of, at least about 90 wt. % of the azeotrope or azeotrope-like composition.

Aspect 9 is a method of forming an azeotrope or azeotrope-like composition comprising the step of combining 3,3,3-trifluoropropyne (TFPY) and hydrogen fluoride (HF) to form an azeotrope or azeotrope-like composition consisting essentially of effective amounts of 3,3,3-trifluoropropyne (TFPY) and hydrogen fluoride (HF) and having a boiling point between about −10.0° C. and about 25.0° C. at a pressure of between about 61 psia and about 171 psia.

Aspect 10 is the method of Aspect 9, wherein the combining step comprises combining from about 71.5 wt. % to about 98.8 wt. % 3,3,3-trifluoropropyne (TFPY) and from about 1.2 wt. % to about 28.5 wt. % hydrogen fluoride (HF).

Aspect 11 is the method of Aspect 9, wherein the combining step comprises combining from about 83.1 wt. % to about 98.8 wt. % 3,3,3-trifluoropropyne (TFPY) and from about 1.2 wt. % to about 16.9 wt. % hydrogen fluoride (HF).

Aspect 12 is a method of separating 3,3,3-trifluoropropyne (TFPY) as an impurity from a composition which includes a primary compound and 3,3,3-trifluoropropyne (TFPY) as an impurity, comprising the steps of: providing a composition including the primary compound and 3,3,3-trifluoropropyne (TFPY) as an impurity; modifying the relative amounts of 3,3,3-trifluoropropyne (TFPY) and hydrogen fluoride (HF) and subjecting the composition to conditions effective to form an azeotrope or azeotrope-like composition consisting essentially of, or consisting of, effective amounts of 3,3,3-trifluoropropyne (TFPY) and hydrogen fluoride (HF); and separating the azeotrope or azeotrope-like composition from the composition including the primary compound.

Aspect 13 is the method of Aspect 12, wherein the step of modifying the relative amounts of 3,3,3-trifluoropropyne (TFPY) and hydrogen fluoride (HF) comprises adding 3,3,3-trifluoropropyne (TFPY) to the composition.

Aspect 14 is the method of Aspect 13, wherein the step of modifying the relative amounts of 3,3,3-trifluoropropyne (TFPY) and hydrogen fluoride (HF) comprises adding hydrogen fluoride (HF) to the composition.

Aspect 15 is the method of Aspect 14, wherein the step of modifying the relative amounts of 3,3,3-trifluoropropyne (TFPY) and hydrogen fluoride (HF) comprises adding both 3,3,3-trifluoropropyne (TFPY) and hydrogen fluoride (HF) to the composition.

Aspect 16 is the method of Aspect 12, wherein the primary compound is selected form the group consisting of 2-chloro-3,3,3-trifluoropropene (1233xf), 2-chloro-1,1,1,2-tetrafluoropropane (HCFC-244bb), and 2,3,3,3-tetrafluoropropene (HFO-1234yf).

Aspect 17 is the method of Aspect 12, wherein the separation step comprises at least one of phase separation, distillation, and fractionation.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the singular forms "a", "an" and "the" include plural unless the context clearly dictates otherwise. Moreover, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances that fall within the scope of the appended claims.

What is claimed is:

1. A method of separating 3,3,3-trifluoropropyne (TFPY) as an impurity from a first composition which includes hydrogen fluoride (HF), at least one primary compound selected from the group consisting of 2-chloro-3,3,3-trifluoropropene (1233xf), 2-chloro-1,1,1,2-tetrafluoropropane (HCFC-244bb), 2,3,3,3-tetrafluoropropene (HFO-1234yf), 1,1,1,2,3-pentafluoropropane (HFC-245eb), 1,3,3,3-tetrafluoropropene (HFO-1234ze), and 1,1,1,3,3-pentafluoropropane (HFC-245fa), and 3,3,3-trifluoropropyne (TFPY) as an impurity, comprising the steps of:

subjecting the first composition to conditions effective to form a second, binary azeotrope or azeotrope-like composition consisting essentially of from about 71.5 wt. % to about 98.8 wt. % 3,3,3-trifluoropropyne (TFPY) and from about 1.2 wt. % to about 28.5 wt. % hydrogen fluoride (HF) at a boiling point between −10.0° C. and 25.0° C. at a pressure of between 61 psia and 166 psia, wherein the azeotrope-like composition is a composition which behaves substantially as an azeotrope composition; and separating the second, binary azeotrope or azeotrope-like composition consisting essentially of TFPY and HF by distillation from the first composition including the at least one primary compound, wherein the at least one primary compound remains in the first composition.

2. The method of claim 1, wherein the primary compound is selected from the group consisting of 2-chloro-3,3,3-trifluoropropene (1233xf), 2-chloro-1,1,1,2-tetrafluoropropane (HCFC-244bb), and 2,3,3,3-tetrafluoropropene (HFO-1234yf); or is selected from the group consisting of 1,1,1,2,3-pentafluoropropane (HFC-245eb) and 2,3,3,3-tetrafluoropropene (HFO-1234yf).

3. The method of claim 1, wherein the primary compound is selected from the group consisting of 1,3,3,3-tetrafluoropropene (HFO-1234ze) and 1,1,1,3,3-pentafluoropropane (HFC-245fa).

4. The method of claim 1, wherein the primary compound is 2,3,3,3-tetrafluoropropene (HFO-1234yf).

5. The method of claim 1, wherein the primary compound is 2-chloro-1,1,1,2-tetrafluoropropane (HCFC-244bb).

6. The method of claim 5, the method further comprising the additional step, after the separating step, of:

reacting the first composition to convert 2-chloro-1,1,1, 2-tetrafluoropropane (HCFC-244bb) to 2,3,3,3-tetrafluoroproane (HFO-1234yf).

7. The method of claim 1, wherein the primary compound is 2-chloro-3,3,3-trifluoropropene (1233xf).

8. The method of claim 1, wherein the primary compound is 1,3,3,3-tetrafluoropropene (HFO-1234ze).

9. The method of claim 1, wherein the primary compound is 1,1,1,2,3-pentafluoropropane (HFC-245eb).

10. The method of claim 1, wherein the primary compound is 1,1,1,3,3-pentafluoropropane (HFC-245fa).

* * * * *